US006181915B1

(12) United States Patent
Lewiner et al.

(10) Patent No.: US 6,181,915 B1
(45) Date of Patent: Jan. 30, 2001

(54) PORTABLE ONE-WAY RADIO PAGER INCLUDING AN ELECTRONIC DIRECTORY

(76) Inventors: Jacques Lewiner, 7, avenue de Suresnes, 92210 Saint Cloud (FR); Eric Carreel, 9, rue du Général Gouraud, 92190 Meudon (FR)

( * ) Notice: Under 35 U.S.C. 154(b), the term of this patent shall be extended for 0 days.

(21) Appl. No.: 08/930,753

(22) PCT Filed: Apr. 4, 1996

(86) PCT No.: PCT/FR96/00512

§ 371 Date: Dec. 8, 1997

§ 102(e) Date: Dec. 8, 1997

(87) PCT Pub. No.: WO96/31850

PCT Pub. Date: Oct. 10, 1996

(30) Foreign Application Priority Data

Apr. 7, 1995 (FR) .................................................. 95 04180

(51) Int. Cl.[7] ........................................ H04Q 7/06

(52) U.S. Cl. ................... 455/31.2; 455/38.1; 340/825.44

(58) Field of Search ................................. 455/31.2, 31.3, 455/32.1, 38.1, 38.2, 38.4, 38.5, 556, 557, 575, 564, 566; 340/825.44, 311.1

(56) References Cited

U.S. PATENT DOCUMENTS

| | | | |
|---|---|---|---|
| 4,490,579 | 12/1984 | Godoshian . | |
| 5,212,721 | 5/1993 | DeLuca et al. . | |
| 5,675,324 | * 10/1997 | Hashimoto et al. | 455/38.4 X |
| 5,675,627 | * 10/1997 | Yaker | 455/38.4 X |

FOREIGN PATENT DOCUMENTS

| | | |
|---|---|---|
| 0086255 | 8/1983 | (EP) . |
| WO-A-9111875 | 8/1991 | (WO) . |
| WO-A-9410781 | 5/1994 | (WO) . |

OTHER PUBLICATIONS

English Translation of International Search Report of PCT/FR96/00512.

* cited by examiner

*Primary Examiner*—Fan Tsang
*Assistant Examiner*—Philip J. Sobutka
(74) *Attorney, Agent, or Firm*—Marshall, O'Toole, Gerstein, Murray & Borun

(57) ABSTRACT

The invention relates to a portable one-way radio pager comprising receiver means (4, 5, 6) for receiving radio messages, a memory (8) for storing the messages, a screen (2), a simplified keypad (3), and an electronic CPU (7). The memory includes an address book (8*a*) which is designed to include at least names and associated telephone numbers, and the CPU is designed to recognize special "downloading" messages to store the contents of such messages in the address book, and to display the data contained in the address book on the screen at the request of a user.

1 Claim, 1 Drawing Sheet

PORTABLE ONE-WAY RADIO PAGER INCLUDING AN ELECTRONIC DIRECTORY

FIELD OF THE INVENTION

The present invention relates to portable one-way radio pagers of the kind comprising receiver means for receiving radio messages, a memory for storing the messages, a screen, a simplified keypad comprising fewer than ten keys, and an electronic CPU, the pager being designed to display on its screen at least some of the messages it receives.

BACKGROUND ART

Many of the messages received by such pagers are requests for the bearer of the pager to call back the original caller on the telephone.

Unfortunately, the original caller does not always ensure that the message includes the telephone number which is to be called back, and as a result, if the bearer of the pager does not have an address book available containing the telephone number of the original caller, then the received message is likely to be without effect, or else the bearer of the pager will be obliged to look up the original caller's telephone number by consulting a telephone directory or possibly by calling his or her own office, which leads to a waste of time and efficiency.

Consequently, if they are to be efficient, bearers of portable radio pagers must also carry telephone numbers around with them in an address book, either in the form of a booklet or else in the form of a cordless electronic unit with an alphanumeric keyboard, thereby making them carry clutter.

A particular object of the present invention is to mitigate those drawbacks.

SUMMARY OF THE INVENTION

To this end, according to the invention, a portable one-way radio pager of the kind in question is essentially characterized in that its memory includes an address book which is designed to include at least one person's name and telephone number, and in that the CPU is designed to:

- recognize special "downloading" radio messages including at least a name and data relating to said name for storage in the address book;
- store the contents of the downloading messages in the address book of the memory; and
- display the data contained in the address book on the screen as a function of commands received from a user by means of the keypad.

By means of these dispositions, it is possible to integrate an address book in the portable radio pager even though the simplified keypad of the pager is unsuitable in practice for directly inputting data into the address book, in particular names and telephone numbers.

Thus, bearers of such pagers always have a telephone address book available, thereby enabling them to respond optimally to messages received, and secondly they are not cluttered up with extra objects to be carried around such as a booklet or an electronic unit.

It should be observed that it is very easy for a user to enter data into the electronic address book, and no complex manipulation is required.

All the user needs to do is telephone a human operator at a station for transmitting pager messages in the network to which the pager belongs. In the same manner as is already common for ordinary messages, the operator then causes the desired radio message to be transmitted, which in the present case contains the data to be stored in the address book of the user's own pager.

In preferred embodiments of the portable radio pager, use may also be made of one or more of the following dispositions:

- the CPU is designed to recognize at least one predetermined string of characters included in each downloading paging message, thereby enabling said downloading paging message to be recognized;
- the address book is also designed to include a respective address for each name;
- the address book is also designed to include an additional telephone number associated with each name respectively, said additional telephone number being that of a fax associated with that name;
- the address book is also designed to include a personal radio pager number associated with each name, respectively;
- the keypad does not include any alphanumeric keys;
- the pager further comprises a sound signal emitter, the CPU being designed to: enable a user to use the keypad to select a number contained in the address book; and cause the sound signal emitter to emit a run of individual sound signals respectively corresponding to the various digits of the selected number in a "voice frequency" dialing system; in particular, this telephone number may be a telephone number proper, a fax number, or a person's radio pager number, providing dialing the number on a telephone keypad gives rise to a telephone call to an operator of a station for transmitting radio paging messages in order to send a radio message to the radio pager of that person; and
- the pager further comprises a connector which is connected to the CPU and which enables a connection to be made to an external printer, the CPU being designed to cause said printer to print data stored in the address book.

The invention also provides a method of storing data in the address book of a portable radio pager as defined above and which receives radio messages from at least one transmitter station, the method comprising the following steps:

a) sending the data to be stored in the address book of the radio pager to the transmitter station; and b) causing the transmitter station to transmit a downloading radio message for entering into the address book of the radio pager.

In preferred implementations of this method, use is also made of one or more of the following dispositions:

- the transmitter station is controlled, at least in part, by a human operator, step a) consisting in telephoning the human operator to give the identity of the pager whose address book is to store the data, and also the data to be stored in the address book: in this way, the user of the pager has no difficulty in creating or modifying the address book;
- the downloading message includes at least one string of predetermined characters that is recognizable by the CPU of the pager; and
- the downloading message is integrated in a message for displaying on the screen of the portable pager, thereby making it possible optionally to enrich the address book progressively as messages are received from various persons, providing said messages include downloading messages containing data relating to those persons.

Other characteristics and advantages of the invention appear from the following detailed description of an embodiment thereof, given by way of non-limiting example and with reference to the accompanying drawing.

DESCRIPTION OF THE PREFERRED EMBODIMENT

In the various figures, the same references are used to designate elements that are identical or similar.

Figure 1:
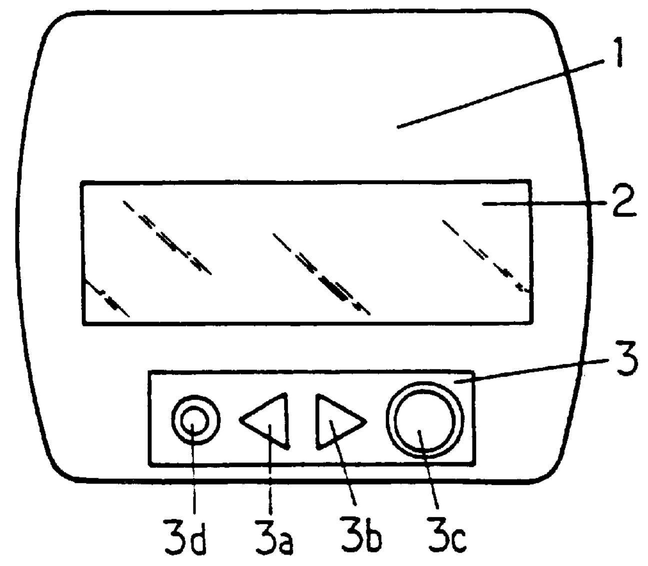
FIG. 1 shows an example of a portable radio pager of the invention.

The one-way radio pager of the invention consists in a portable unit 1 such as that shown in FIG. 1, which is designed to receive encoded radio messages transmitted by a distant transmitter station 20 (FIG. 2), the radio messages being encoded, for example, in compliance with the ERMES standard (EEC Directives 85/374 and 92/59, ETS standard 300.133-1 to -7 published by the European Telecommunications Standards Institute).

The unit is small in size, e.g. being a few centimeters in its greatest dimension, so as to make it suitable for holding in one hand.

On the outside, the unit 1 has a screen 2 for displaying all or a part of messages received by radio and addressed to said unit, and a keypad 3 serving, in particular, to control the display of such messages, to erase them, etc.

The keypad 3 is always a simple keypad having only a few keys, the number of keys always being fewer than ten and in most cases fewer than six.

Generally, the keypad 3 has four keys, namely:

- two scroll keys 3*a* and 3*b* serving in particular to move a cursor through menus displayed on the screen 2;
- a select key 3*c*, in particular for selecting an option in a menu displayed on the screen 2; and
- a key 3*d* serving in particular to make visible or to modify the menu displayed on the screen 2.

Figure 2:
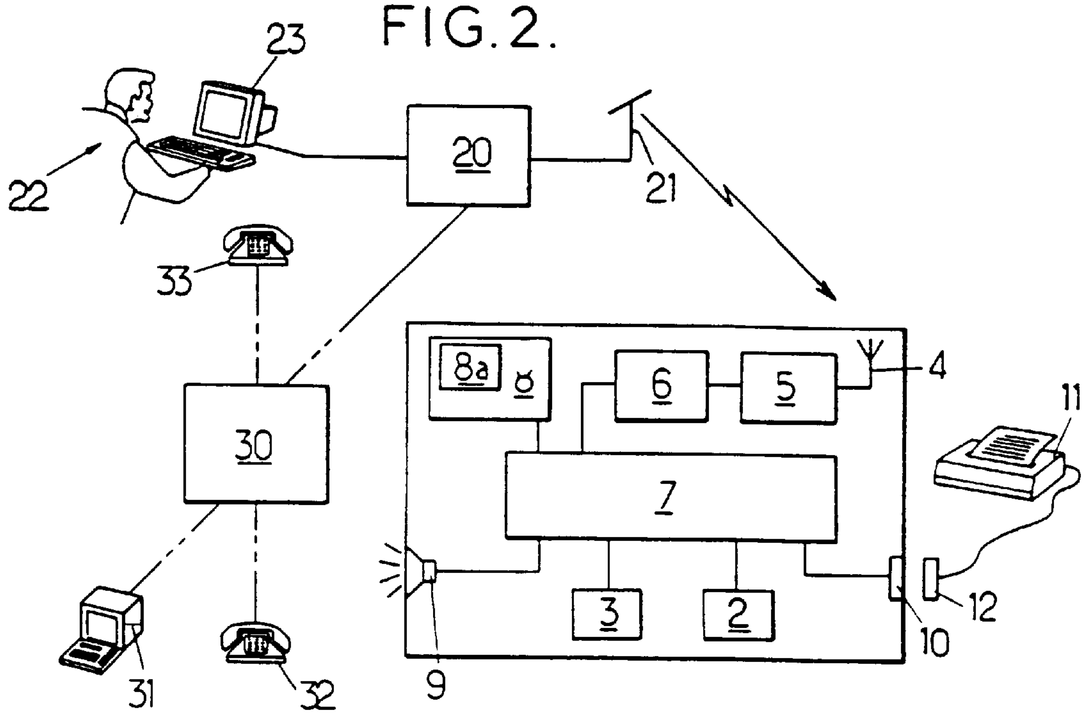
FIG. 2 is a block diagram of the FIG. 1 pager operating in its environment.

FIG. 2 shows in particular a block diagram of the pager unit 1 which comprises, in conventional manner:

- an antenna 4 for receiving radio messages transmitted by an antenna 21 of the transmitter station 20;
- an amplifier 5 connected to the antenna 4 to amplify the signals received by the antenna 4;
- a demodulator 6 connected to the output of the amplifier 5 to demodulate the amplified signals coming from the amplifier;
- an electronic CPU 7 generally constituted by a microprocessor, connected to the output of the demodulator 6 to receive, decode, and process the demodulated signals coming from the demodulator 6, the CPU 7 being connected to the screen 2 and to the keypad 3;
- a memory 8 either connected to the CPU 7 or integrated therein in part or in full; and
- a miniature loudspeaker 9 connected to the CPU 7 and designed at least to emit a warning sound signal or "beep" each time the CPU receives a radio message addressed to the pager unit 1 under consideration.

Advantageously, the pager 1 can also include an external connector 10 enabling it to be connected to a printer 11 via a complementary connector 12.

The memory 8 includes an address book 8*a* forming a database which is in the form of a list of names respectively associated with at least one telephone number, and possibly with an address, an additional telephone number for a corresponding fax, a radio pager number belonging to a radio pager of the person concerned.

Amongst the messages addressed to the unit 1 and received via the antenna 4, the CPU 7 is programmed to recognize special messages referred to as "downloading" messages, which include data for storage in the address book 8*a*.

The CPU 7 may recognize these downloading messages, for example, by means of predetermined character strings included in the messages.

By way of non-limiting example, a downloading message may be in the following form:

"aaa bbb DUPONT ccc 83 rue d'Amsterdam 75009 PARIS ddd 40.72.20.33 eee 40.72.20.34 ***".

In this example, the CPU 7 would store the name "DUPONT" in the address book under "names", at the address "83 rue d'Amsterdam 75009 PARIS", with the telephone number "40.72.20.33", and with the fax number "40.72.20.34".

In this particular example, the beginning of the downloading message is marked by the sequence "aaa", the end of the downloading message is marked by the sequence "***", the beginning of the name is marked by the sequence "bbb", the beginning of the address is marked by the sequence "ccc", the beginning of the telephone number is marked by the sequence "ddd", and the beginning of the fax number is marked by the sequence "eee".

Naturally other modes of marking and identifying downloadings messages can be used in the context of the present invention.

The donwloading messages which reach the pager unit 1 may relate to one or more names, and they may optionally be included within a message for display on the screen 2 of the unit.

A caller can thus ask the bearer of the pager to call back, while simultaneously causing his or her own name and telephone number to be entered into the address book of the pager.

Returning to the above example, Mr. DUPONT could thus decide to send the following message to the bearer of the pager: "Please call me back urgently aaa bbb DUPONT ddd 40.72.20.33 ***"

In this case, the CPU 7 would:

- cause the loudspeaker 9 to emit a warning signal to indicate that a message for the pager 1 has been received;
- store "DUPONT" amongst the names in the address book 8*a* together with "40.72.20.33" as the telephone number that corresponds thereto; and
- display the following message:

"Please call me back urgently DUPONT 40.72.20.33"

on the screen 2, i.e. without displaying the character sequences "aaa", "bbb", "ddd", and "***" used for marking and identifying the downloading message and its contents.

In this way, the address book 8*a* is enriched as messages are received from various callers.

The transmission of downloading messages to the pager 1, like the transmission of any other message, can conventionally be requested:

- either directly of the transmitter station 20 by connecting a microcomputer 31 or the like to said station via the switched telephone network 30;
- or else indirectly by using an ordinary telephone set 32 connected to the switched telephone network 30 and telephoning an operator 22 who has a console 23 connected to the computer system of the transmitter station 20, and also a telephone set 33 connected to the switched telephone network 30.

The user of the pager 1 can consult the contents of the address book 8*a* on the screen 2 by means of commands issued to the CPU 7 via the keypad 3.

For example, the user may bring up a menu on the screen 2 by pressing the button 3*d*, and can then select from said menu the "ADDRESS BOOK" function by positioning the cursor on the corresponding option in the menu using the direction keys 3*a* and 3*b*, and then confirming the selected option by means of the enter key 3*c*, after which, for example, the user can cause the names to be scrolled together with the data relating to those names by means of the direction keys 3*a* and 3*b*, until the desired name has been found.

A name can be deleted from the address book 8 by the user, e.g. by applying the above sequence and then using the keypad 3 to select an "ERASE" function from a menu displayed on the screen 2.

Where appropriate, the CPU 7 can be programmed so that the user is capable of using the keypad 3 to select from the address book 8*a* a number corresponding to:

a telephone number proper;

a fax number;

a personal radio pager number when the radio pager network is designed so that dialing such a number on a telephone keypad causes a call to be made to an operator 22 of a transmitter station 20, which operator can then send a radio message to the pager having that personal number; or a number for calling any other device connected to the switched telephone network.

The CPU 7 is then programmed so that once the selection has been made, the user can, e.g. by pressing on the enter key 3*c*, trigger emission by the loudspeaker 9 of a run of individual sound signals at frequencies which correspond to the various digits of the selected number in a "voice frequency" dialing system specific to the switched telephone network 30.

The term "voice frequency dialing system" means a dialing system in which dialing a number on a telephone keypad causes a run of electrical signals to be emitted into the switched telephone network, with the respective electrical signals corresponding to the various digits of the dialled number and being in the form of frequencies such that audio signals correspond to sound signals of the same frequency. In practice, the voice frequency dialing system used is the system generally known as dual tone multifrequency (DTMF), in which each individual sound signal comprises two superposed frequencies.

Thus, by putting the loudspeaker 9 close to the earpiece of a telephone set 32 whose handset has been lifted, and then triggering emission of the run of individual sound signals, the user can cause the selected telephone number to be dialled automatically by the telephone set, merely by emitting individual sound signals, as is well known per se in devices commonly called "dialers".

Also, when the pager unit 1 includes an external connector 10, it is also possible to print all or part of the contents of the address book 8*a* by means of the printer 11, with such printing being under the control of the keypad 3, by selecting an option from a menu that is brought up on the screen 2.

What is claimed is:

1. A method for storing data in a portable one way radio pager having a memory, said pager comprising:

receiver means for receiving radio paging messages, said memory storing the messages and including a database forming a personal directory which is specific to a user to whom the pager belongs, said personal directory including several persons' names and telephone numbers, and said personal directory being also designed to include a respective address for each name, a CPU, a screen, and a simplified key pad comprising less than ten keys, said method comprising the following steps:

a) the user telephones a human operator and gives the human operator data to be stored in the personal directory of the pager belonging to said user, said data comprising at least one person's name and a phone number and an identification corresponding to said pager belonging to the user;

b) said human operator causes a transmitter station to transmit a downloading radio message including a predetermined code as well as said data to be stored in the personal directory;

c) said pager receives said downloading radio message;

d) the CPU of the pager checks said predetermined code and recognizes said message as a downloading radio message due to the presence of said predetermined code; and e) the CPU of the pager stores the data contained in said downloading radio message directly in the personal directory, without checking any additional directory and without adding any additional information.

* * * * *